United States Patent [19]
Komaru et al.

[11] 3,753,744
[45] Aug. 21, 1973

[54] GRAPHITE-ALUMINA-SILICON CARBIDE BASE REFRACTORY

[75] Inventors: Isamu Komaru; Kenzo Takeda; Kazuo Yuki, all of Osaka, Japan

[73] Assignee: Nippon Crucible Co., Ltd., Tokyo, Japan

[22] Filed: Dec. 27, 1971

[21] Appl. No.: 212,394

[52] U.S. Cl............................ 106/56, 106/44, 106/65
[51] Int. Cl.................................................. C04b 35/52
[58] Field of Search........................ 106/44, 56, 65

[56] References Cited
UNITED STATES PATENTS

| | | | |
|---|---|---|---|
| 2,104,841 | 1/1938 | White | 106/44 |
| 2,431,327 | 11/1947 | Geiger | 106/44 |
| 3,227,566 | 1/1966 | Hilton et al. | 106/44 |
| 3,329,514 | 7/1967 | Saunders et al. | 106/44 |

*Primary Examiner*—James E. Poer
*Attorney*—Richard C. Sughrue, J. Frank Osha et al.

[57] ABSTRACT

This invention provides a graphite-alumina-silicon carbide base refractory having good erosion resistance, spalling resistance and durable for oxidizing attack at elevated temperature. This refractory contains more than 85 wt. percent of main components of graphite (including combined carbon), alumina and silicon carbide (the weight ratio of graphite:alumina:silicon carbide being 10–38:60–80:2–18), and these three main components are combined with each other by a carbon bond which contains glassy material (2–6 wt. percent) and forms the network structure.

5 Claims, 1 Drawing Figure

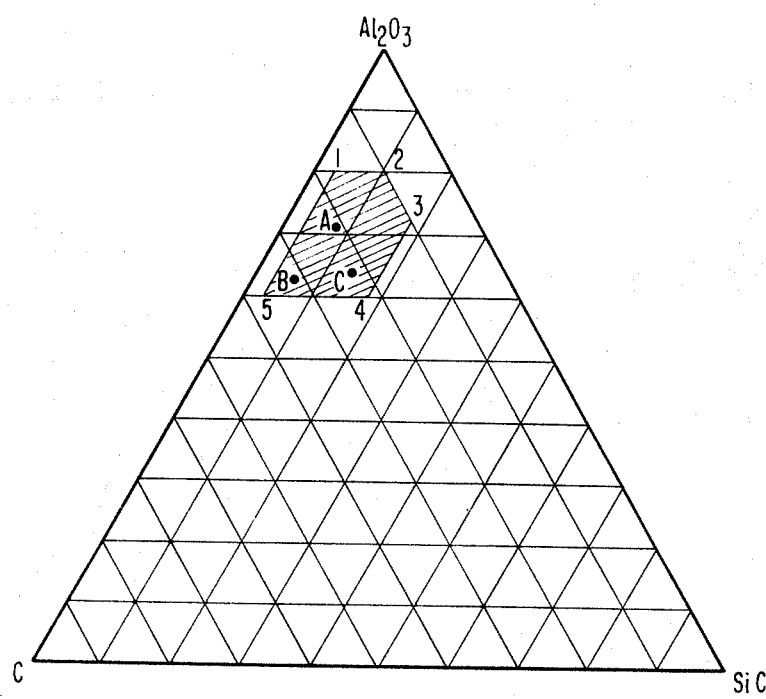

GRAPHITE-ALUMINA-SILICON CARBIDE BASE REFRACTORY

DETAILED EXPLANATION OF THE INVENTION

This invention relates to a graphite-alumina-silicon carbide base refractory containing the graphite, the alumina and the silicon carbide mutually combined by a carbon bond having a continuous network structure and a glassy component, and exhibiting excellent erosion resistance, spalling resistance and oxidation resistance at high temperature, as above 1,000° C.

The high alumina refractory produced by the electrocasting or burning process has such various favorable features as high refractory property, high load softening temperature, high mechanical strength, high abrasion resistance and high durability for erosive slag attacks, and accordingly is applied to a high temperature furnace zone exposed to the relatively short range, for example, the lining of a rotary kiln or a glass melting furnace. This high alumina refractory, however, does not necessarily exhibit the fully desirable spalling resistance when applied to furnace parts which are exposed to the wide range by the intermittent attacks of molten metals or fused slags, for example, the mouth of a basic oxygen furnace, the bottom plate of an upper pouring ingot mold or the tapping channel of a blast furnace.

On the other hand, a graphite-silicon carbide refractory is easily oxidized at high temperature in spite of the fact that it has a high pyrometric cone equivalent, high load softening point, chemical neutrality, excellent erosion resistance due to poor wettability to molten metals and slags, and strong resistance to abrupt temperature changes derived from high thermal conductivity.

After studies on both the erosive attacks of molten metals and slags on the refractory and the thermal conductivity of the refractory relating to the spalling resistance, the inventors have discovered that the erosion of relatively large sized particles in the refractory composition due to the attack of fused metals and slags is relatively slow since large sized particles have small specific surface areas, whereas the erosion of small sized particles and the refractory matrix, which combines the particles with each other, is first caused to project and slip out the coarse particles from the surface of the refractory body as the coarse particles are kept uneroded.

Therefore, this invention was made on a discovery that the increase of the erosion resistance of the refractory matrix and the decrease of the surface areas of the refractory matrix improve the erosion resistance of the refractory as a whole.

When the refractory is exposed to abrupt temperature change, the thermal stress is accumulated in the refractory whereby the cracks designated as "thermal spalling" are caused in the refractory. If the thermal conductivity of the refractory is high, the temperature difference in the refractory is minimized and the thermal stress is not caused in the refractory, thus increasing the resistance to thermal spalling. The thermal conductivity of the usual refractory is determined by its porosity and the thermal conductivity of each constituent of the refractory, but this is not the case with the refractory of this invention having the continuous network of high thermally conductive material for bonding the refractory particles. That is to say, the thermal conductivity of this refractory is increased not only by the highly conductive refractory particles themselves but also the highly conductive binder network. According to empirical work, in the case that a network structure of highly thermal conductive material composed of ultra fine particles of graphite-silicon carbide and combined carbon having a thermal conductivity of 20 K cal/m. hr. °C is applied to highly pure alumina coarse particles having a thermal conductivity of 3.5 K cal/m.hr. °C, the thermal conductivity of the resulting refractory does not increase remarkably if the content of the thermally conductive material is about 10 wt. percent, but increases abruptly if the content becomes 20 wt. percent or more. The thermal conductivity of the resulting refractory almost accords with that of the thermal conductive material if the content of the latter reaches 50 wt. percent.

Therefore, the high alumina refractory of this invention has excellent erosion and spalling resistance and exhibits durability for oxidizing attacks at high temperature.

The action or function of each component of this refractory and the reason for determining the preferable ranges of the content of the components will be described below.

The alumina, which may be obtained from the electrofusing or sintering process, preferably has a purity of at least 94 wt. percent, and serves to increase the pyrometric cone equivalent, the load softening point, the mechanical strength, and the resistance to the erosive slag attacks for the resulting refractory. The thermal conductivity of the pure alumina is the highest among other components of the refractory, except for the graphite and the silicon carbide. The alumina particles are preferably composed of most parts of the coarse particles having a size of 4,760–297 microns and small parts of fine particles having a size of less than 105 microns, but the grain size distribution is not restricted to this range. particles having a size of The total amount of alumina lies preferably in 60–80 wt. percent. If the amount of alumina exceeds 80 wt. percent, the spalling resistance is worsened, whereas if the alumina amount is not more than 60 percent, the erosion resistance, the fire resistance and the oxidation resistance are reduced. The electrofused alumina particles having a rugged shape are well entangled with the network structure of the carbon bond, and impart high mechanical strength to the resulting refractory. On the other hand, burned alumina particles having the fine pores or voids also impart high mechanical strength to the resulting refractory, as the carbon bond penetrates into the pores.

The graphite, preferably natural graphite crystal, may have any shape of flake, vein or amorphous, so long as its ash content is not too much, but too large sized crystals can not be dispersed uniformly in the matrix, whereas too small sized crystals reduce the oxidation resistance of the resulting refractory due to the increase of the surface areas of the graphite crystals. Therefore, the favorable grain size of the graphite particle is that which passes through a sieve opening of 297 microns.

If the graphite amount is not more than 8 wt. percent the desired thermal conductivity, erosion resistance and wettability to fused slags or metals are not obtained, whereas if the graphite content exceeds 37 wt. percent the desired oxidation resistance and mechanical strength are not obtained. The graphite content is explained as the carbon content in the chemical analysis.

The silicon carbide disperses in the network structure of the carbon bond and improves the oxidation resistance and the mechanical strength of the resulting refractory. If the silicon carbide content is not more than 2 wt. percent, the aforesaid effect of the Si carbide is not observed, whereas if the Si carbide content exceeds more than 18 wt. percent, the thermal conductivity and the erosion resistance are reduced.

If silicon or silicon alloy in pulverized form is added to the carbon bond, the mechanical strength of the resulting refractory is increased due to a formation of Si carbide by a reaction of Si or Si alloy with carbon at relatively low temperature. The Si carbide thus formed, or that added to the refractory composition from the first, is converted into $SiO_2$ when brought into contact with oxygen at high temperature, and this $SiO_2$ sticks to the surface of the refractory body as a thin vitreous film which turns out to serve to prevent the oxidation of graphite and combined carbon. The addition of less that 1 percent of Si or Si alloy to the carbon bond is ineffective, whereas the addition of more than 7 percent of Si or Si alloy much reduces the fire resistance of the resulting refractory.

The forming and burning processes for the usual carbon bond refractory can be applied to the production of the refractory of this invention.

The pitch or tar serves as the binder for the aforesaid components in the forming or molding stage, but serves as the secondary binder together with the Si carbide and forms the aforesaid thermal conductive material after the forming is burned in the reducing atmosphere and the volatile matters are expelled from the pitch or tar.

An excess amount of pitch or tar unwillingly increases the porosity of the resulting refractory and decreases the mechanical strength after burning and the oxidation resistance, whereas an insufficient amount of pitch or tar makes difficult the forming or molding of the starting composition.

Now, some examples of this invention will be described with reference to the following Tables and an accompanied drawing which shows a ternary diagram of graphite alumina and silicon carbide.

The sum of the amounts of alumina, carbon (sum of the graphite and the combined carbon) and Si carbide must be at least 85 wt. percent after the burning of the starting refractory composition in a reducing atmosphere, and besides must lie in a hatched zone surrounded by point 1 ($Al_2O_3$ 80 wt. percent, C 18 wt. percent, SiC 2 wt. percent), point 2 ($Al_2O_3$ 80 percent, C 10 wt. percent, SiC 10 wt. percent), point 3 ($Al_2O_3$ 72 wt. percent, C 10 wt. percent, SiC 18 wt. percent), point 4 ($Al_2O_3$ 60 wt. percent, C 22 wt. percent, SiC 18 wt. percent) and point 5 ($Al_2O_3$ 60 wt. percent, C 38 wt. percent, SiC 2 wt. percent) in the drawing.

Table 1 shows the starting composition of the refractory (A,B,C) of this invention.

The starting composition (A,B,C) was heated at a temperature 100–300° C higher than the softening point of the pitch and well mixed at that temperature. Then the heated composition was compressed and formed into the desired shape with about 500–1,000 Kg/cm² pressure in a mole preheated at 80–100° C, and successively burned at about 1,300° C in a reducing atmosphere.

TABLE 1

|  | Percent | | |
|---|---|---|---|
|  | A | B | C |
| Electrocast alumina powder (−4760 297μ size) | 48 |  | 50 |
| Electrocast alumina powder (−105μ size) | 20 |  | 10 |
| Sintered alumina powder (−4760 297μ size) |  | 50 |  |
| Sintered alumina powder (−105μ size) |  | 8 |  |
| Natural graphite powder (−297μ size) | 18 | 29 | 20 |
| Silicon carbide powder | 7 | 4 | 11 |
| Silicon powder | 4 |  | 5 |
| Ferrosilicon powder |  | 4 |  |
| Glassy material (M.P. about 900° C.) | 3 | 5 | 4 |
| Pitch* | 4 | 4.5 | 4 |
| Tar* | 4 | 4.5 | 4 |

*Amounts of pitch and tar are indicated as weight parts with respect to 100 weight parts of the refractories (A, B, C).

Table 2 shows the various physical properties of the burned refractories (A,B,C) of this invention, that of the conventional high alumina refractory (D) and that of the conventional graphite-silicon carbide refractory (E).

TABLE 2

|  | A | B | C | D | E |
|---|---|---|---|---|---|
| Apparent specific gravity | 3.26 | 3.19 | 3.21 | 3.41 | 2.64 |
| Bulk density | 2.81 | 2.76 | 2.77 | 3.17 | 2.20 |
| Apparent porosity (percent) | 14.1 | 16.7 | 14.9 | 1.91 | 17.0 |
| Compressive strength (kg./cm.²) | 626 | 346 | 560 | 760 | 583 |
| Bending strength (kg./cm.²): |  |  |  |  |  |
| At room temp. | 247 | 205 | 225 | 310 | 220 |
| At 1,200° C | 102 | 112 | 103 | 100 | 105 |
| At 1,400° C | 70 | 88 | 75 | 80 | 82 |
| Load softening point $T_2$(° C.) | (a) | (a) | (a) | (b) | (a) |
| Thermal expansion rate (percent) at 1,600° C | 1.06 | 1.01 | 0.98 | 1.45 | 0.85 |

ᵃAbove 1,700.  ᵇAbove 1,600.

Table 3 shows the results of the chemical analysis for the refractories (A,B,C,D,E).

TABLE 3

|  | A | B | C | D | E |  |
|---|---|---|---|---|---|---|
| $SiO_2$ | 5.8 | 4.5 | 5.6 | 14.8 | 16.2 |  |
| $Al_2O_3$ | 67.8 | 57.5 | 58.1 | 89.9 | 1.0 |  |
| $Fe_2O_3$ | 1.5 | 3.0 | 1.8 | 3.1 | 3.8 |  |
| CaO | 0.6 | 0.8 | 0.7 | 0.6 | 0.5 |  |
| SiC | 7.5 | 5.1 | 12.3 |  | 47.1 |  |
| C | 20.1 | 29 | 21.0 |  | 31.4 | (wt.%) |

The sum of 3 main components, carbon, alumina and Si carbide was 95.1 percent for A, 91.6 percent for B and 91.4 percent for C, respectively. The weight ratio of C: $Al_2O_3$: SiO in the refractories A,B,C are shown in Table 4.

TABLE 4

|  | A | B | C |
|---|---|---|---|
| C | 21.2 | 31.7 | 23.0 |
| $Al_2O_3$ | 71.0 | 62.7 | 63.3 |
| $SiO_2$ | 7.8 | 5.6 | 13.7 |

These C: $Al_2O_3$ : SiO ratios are shown in the drawing as point A, point B and point C.

The thermal conductivity, the spalling resistance and the oxidation resistance of refractories A–E are shown in Table 5.

The spalling resistance is tested by heating a refractory specimen at 1,300° C, dipping the heated specimen immediately after removal from the heating furnace into water, and repeating the heating and water cooling cycle until crackformation is observed.

The oxidation resistance is tested by measuring a temperature at which the weight loss of the refractory specimen stops. The measuring of the weight loss is carried out by the thermobalance method.

TABLE 5

|  | A | B | C | D | E |
|---|---|---|---|---|---|
| Thermal conductivity (K cal/m.hr°C) | 13 | 16 | 15 | 3.5 | 18 |
| Spalling resistance (times required for forming the first crack) | 4 | 5 | 5 | 1 | 6 |
| Oxidation stopping temp. (°C) | 1250 | 1240 | 1200 |  | 1160 |

The thermal conductivity, the spalling resistance and the oxidation resistance of the refractory specimens A, B and C are well comparative with that of the graphite-silicon carbide refractory specimen E, and therefore the refractory of this invention is well durable for the abrupt change of temperature as similarly as the graphite-silicon carbide refractory.

The erosion resistances of the refractory specimens A–E were tested by the following manner. Pluralities of refractory rod specimens having a trapezoid cross section were applied on the inner side wall of an inclined rotary tube furnace so that the inner face was formed as a polygonal tube. Metal or slag was charged in the rotating furnace, and an oxygen-acetylene flame was injected thereto to melt the metal or slag. After a predetermined period of time, the amount of erosion on the inner face of the polygonal tube was measured. Steel, pig iron, converter slag having a basicity of about 3 and blast furnace slag having a basicity of about 1.2 were used as the erosive agent for the refractory specimens. The test results are shown in Table 6.

TABLE 6

|  | A | B | C | D | E |
|---|---|---|---|---|---|
| Steel | 0.5 | 0.6 | 7 | 0.5 | 23 |
| pig iron | 0.4 | 0.3 | 0.4 | 1 | 8 |
| Converter slag | 7 | 3 | 8 | 8 | 12 |
| Blast furnace slag | 4 | 4 | 3 | 5 | 5 |

The erosion amount of each specimen was set on the basis of the erosion amount of specimen D with pig iron.

It is apparent from the above Table 6 that refractory specimens A and B are durable for the attack of molten steel and basic slag and suitable for building steel making furnaces, and that refractory specimen C is durable for the attack of molten pig and blast furnace slag and suitable for building the blast furnace. The eroded surfaces of refractory specimens A, B and C were very smooth and not stuck by the metal and slag. Besides, these refractory specimens exhibited excellent spalling resistance and oxidation resistance at a high temperature range.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of the invention.

What is claimed is:

1. A refractory consisting essentially of 10 to 38 percent by weight, as analyzed carbon content, of graphite, 60 to 80 percent by weight of alumina, 2 to 18 percent by weight of silicon carbide, and a carbon binder of a network structure containing 2 to 6 percent by weight of a vitreous matter and combining said three ingredients with each other, the total amount of graphite including combined carbon, alumina, and silicon carbide being at least 85 percent of the total amount of the refractory.

2. The refractory of claim 1, wherein said alumina is an electrofused or sintered alumina having a purity of at least 94 percent.

3. The refractory of claim 1, wherein said graphite is a naturally occurring graphite in a flake, vein or amorphous form.

4. The refractory of claim 1, wherein said carbon binder contains 1 to 7 percent by weight of silicon or its alloy in the pulverized state.

5. The refractory of claim 1, wherein said vitreous matter has a softening point of 800° to 1,200° C and has good wettability with graphite.

* * * * *

UNITED STATES PATENT OFFICE
CERTIFICATE OF CORRECTION

Patent No. 3,753,744                     Dated August 21, 1973

Inventor(s) Isamu Komaru et al

It is certified that error appears in the above-identified patent and that said Letters Patent are hereby corrected as shown below:

In The Heading:

Claim to Priority was omitted: Should Read:

December 25, 1970     Japan................125620/70

Signed and sealed this 5th day of March 1974.

(SEAL)
Attest:

EDWARD M. FLETCHER, JR.           C. MARSHALL DANN
Attesting Officer                 Commissioner of Patents